United States Patent [19]

Hon

[11] Patent Number: 4,490,810
[45] Date of Patent: Dec. 25, 1984

[54] AUTOMATED INSTRUCTION, GAME AND DATA RETRIEVAL SYSTEM

[76] Inventor: David C. Hon, 1450 NW. Woodbine Way, Seattle, Wash. 98177

[21] Appl. No.: 348,794

[22] Filed: Feb. 16, 1982

[51] Int. Cl.³ .................. H04N 5/76; G11B 31/00
[52] U.S. Cl. .................. 364/900; 434/308; 364/410
[58] Field of Search .......... 434/307, 308, 338, 350, 434/362, 309, 323, 366, 321; 358/342, 311, 102, 903, 327, 310, 335; 360/69, 79, 86; 364/410, 521, 200, 900; 369/24; 340/700, 702, 725, 706, 707, 711

[56] References Cited

U.S. PATENT DOCUMENTS

| | | | |
|---|---|---|---|
| 3,924,339 | 12/1975 | Wilson et al. | 434/308 |
| 3,934,226 | 1/1976 | Stone et al. | 434/308 |
| 3,942,268 | 3/1976 | Wilson | 434/308 |
| 3,996,671 | 12/1976 | Foster | 434/321 |
| 4,000,510 | 12/1976 | Cheney et al. | 358/903 |
| 4,052,798 | 10/1977 | Tomita et al. | 434/307 |
| 4,060,915 | 12/1977 | Conway | 434/307 |
| 4,081,184 | 3/1978 | Brooks | 369/24 |
| 4,091,550 | 5/1978 | Schrenk et al. | 434/366 |
| 4,258,385 | 3/1981 | Greenberg et al. | 358/311 |
| 4,259,668 | 3/1981 | Nishimura et al. | 340/711 |
| 4,305,131 | 12/1981 | Best | 364/410 |
| 4,321,673 | 3/1982 | Hawwass et al. | 364/410 |
| 4,332,022 | 5/1982 | Ceshkovsky et al. | 358/342 |
| 4,333,152 | 6/1982 | Best | 358/102 |
| 4,360,345 | 11/1982 | Hon | 434/307 |
| 4,384,284 | 5/1983 | Juso et al. | 434/307 |
| 4,386,375 | 5/1983 | Altman | 358/327 |

OTHER PUBLICATIONS

Robert Rathbun, "Unique Interactive Training System Designed to Save Time, Money and Lives", Video User, Aug. 1981, p. 10.

Hessinger, Lynn, "Computer and Videodisc: A new way to teach CPR", Biomedical Communications, 9/1981, p. 12.

Hon, David C., "Disc Production", Nos. I thru VI, Videodisc News, Mar. thru Aug., 1981.

Hon, David C., "Interactive Video", Video User, 9/1981 thru 1/1982.

Levitt, Harry and Slosberg, Ronald, Educational Technology, p. 42, "Computer Simulated Patients for Enhancing Clinical Experiences", 6/78.

Primary Examiner—Gareth D. Shaw
Assistant Examiner—Jameson Lee
Attorney, Agent, or Firm—Gerald G. Crutsinger; John F. Booth; James O. Dixon

[57] ABSTRACT

An automated interactive game, instruction and reference system having an optical laser videodisc player unit and using a videodisc record on which are recorded segmented groups of graphic and pictorial video information data interspersed with segmented groups of system control and programming data, a television video display unit, a user command/response unit having user manual input controls of variable functions and variable labelling means therefor to indicate the current function as established by signals from said videodisc record, and control processor means for receiving short segments of programming data from said videodisc record and distributing information signals from said videodisc record to the other units in accordance with said programming data.

20 Claims, 19 Drawing Figures

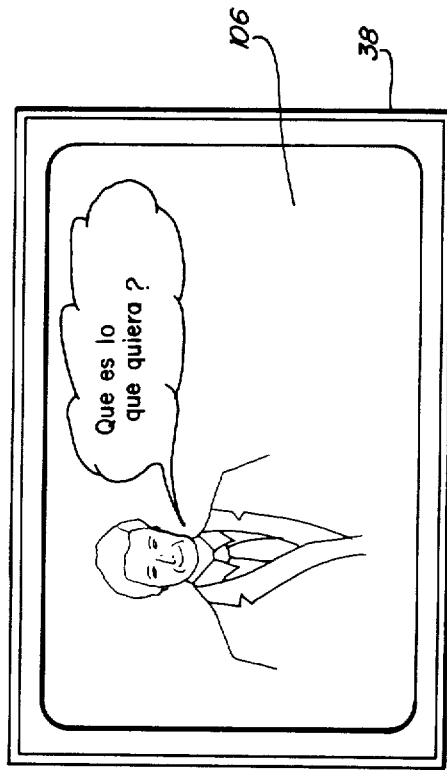
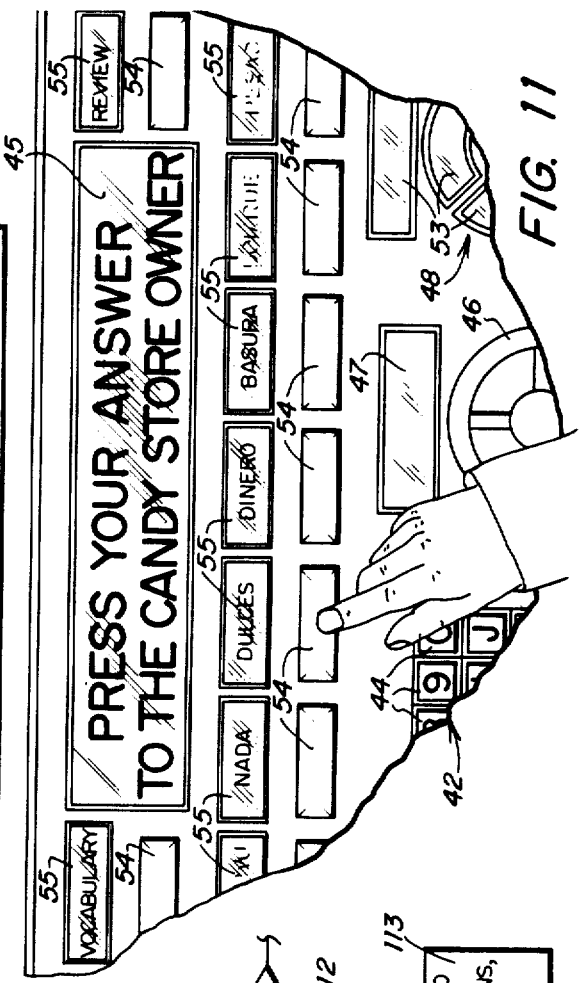
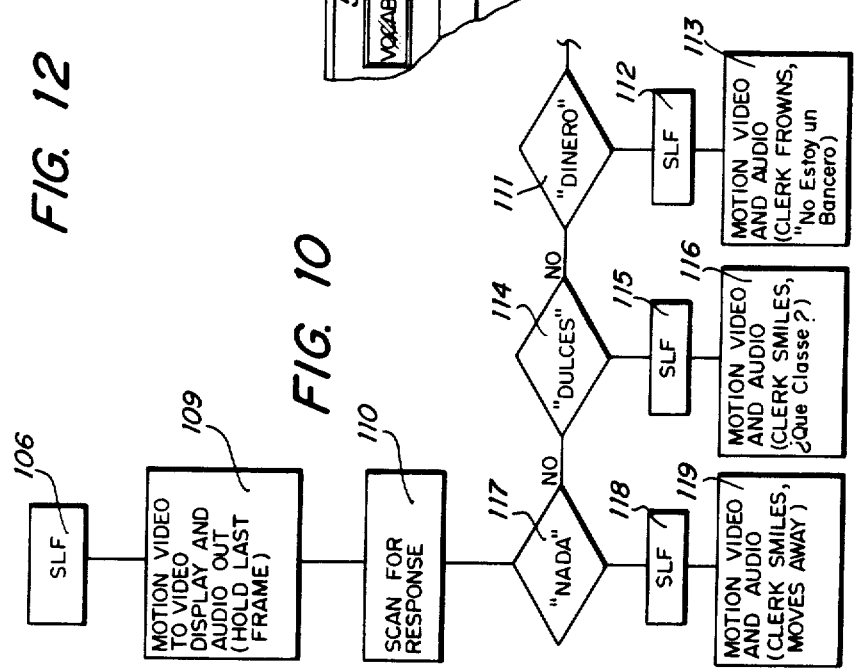

AUTOMATED INSTRUCTION, GAME AND DATA RETRIEVAL SYSTEM

BACKGROUND OF THE INVENTION

This invention relates to automated instruction, game, and data retrieval systems, and, more specifically to such systems incorporating optical laser videodisc-type storage of both data and program materials.

The invention herein provides greater versatility and flexibility than current simple remote control systems at a cost considerably less than computer-linked systems serving similar purposes. Also, it achieves a high order of man-machine interface, providing the transparency necessary for a more direct user contact with the system and its program content than other systems provide. By "transparency" is meant the ability of the user to perceive directly at the control the desired function rather than having to translate mentally from the control indication to the desired function to be performed.

Designers and producers of the highly interactive programming which is possible with the videodisc have been stalemated by the divergence between (1) low-cost units which would attract high mass consumer interest were it not for their low capability to handle programs which are unique to videodisc (as opposed to video tapes or broadcast sources), and (2) high-cost systems which require a programmable computer to realize the unique facets of the videodisc but because of price and complexity, do not lend themselves mass consumer purchases.

Prior art operating systems for human interaction with a videodisc fall into three general categories. In the first category are those systems which incorporate essentially direct remote control units, usually handheld by the user. In the second category are systems using a programmable micro or minicomputer offering a much higher order, and correspondingly more expensive, program control. A third category of systems and possibly the most advanced of the prior art, combines the videodisc-programmable computer elements with a number of interactive peripherals including visual, aural and sensory elements to provide a plurality of communication avenues between the user and the system.

BRIEF DESCRIPTION OF THE INVENTION

The basic automated instructional, entertainment and data retrieval or reference system of the present invention comprises the following elements: (1) a videodisc with data and program storage, (2) a videodisc player, (3) a video display which may take the form of a standard home television set, (4) a low-cost control processor having limited Random Access Memory capability, and (5) a user command/response unit. The processor element is distinguished from the microcomputer of the prior art in that it is of more limited capability since it does not include program management, programming functions for user entry, or high order decision-making. It consequently is much less expensive. The command/response unit has hardwired functions that may be reconfigured in infinite variety by incoming data from the videodisc.

Optionally additional I/O peripherals can be added and managed through a combination of the control processor, the command/response unit, and the videodisc stored programs. Compressed digital audio from the videodisc may also be incorporated in the system.

It is therefore the object of the present invention to provide an automated instructional, entertainment and reference system wherein all data and program information are stored on the videodisc.

It is further an object to provide an automated instructional, entertainment and reference system with a high degree of flexibility and versatility without the inclusion of a full capability, stored program computer as required in prior art systems.

It is still a further object to provide an automated instructional, entertainment and reference system having a much lower cost than prior art systems of comparable capabilities.

It is an even further object of this invention to provide this system with direct transparent two-way human interaction with the system rather than indirect interaction requiring interim translations by the user.

It is a still further object to provide a lowcost automated instructional, entertainment and reference adaptable to shared component configuration in either a commercial or home environment.

And yet another object of this invention is to provide a low cost automated instructional, educational, and reference system which can be adapted for widespread, interactive multiple-user operations within broadcast, narrowcast, land line, or cable-television systems.

BRIEF DESCRIPTION OF THE DRAWINGS

These and other objects and advantages of my invention will become apparent from the following detailed description when read with reference to accompanying drawings in which:

FIG. 10 is a diagram of program segments from the videodisc for the system operating in an instructional mode.

FIG. 11 shows a portion of the panel of the Control/Response Unit configured in an instructional mode.

FIG. 12 shows the information displayed on the screen of the TV display unit concurrently with the panel display of FIG. 11.

DETAILED DESCRIPTION

Figure 1:
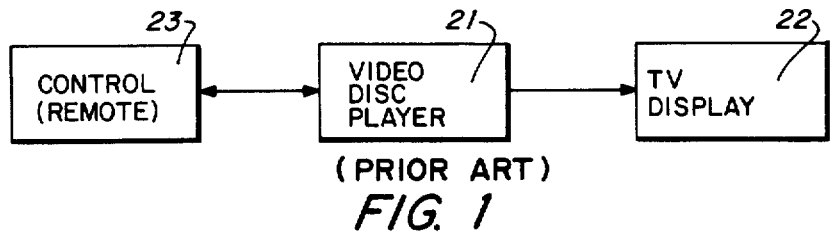
FIG. 1 is a block diagram illustrating a prior art videodisc system with sample remote control.

Referring now to the drawings, FIG. 1 illustrates a typical optical laser videodisc player system currently available commercially. The system includes player unit 21 with self-contained mechanical and electrical operating elements, a TV display unit 22, which may be a standard commercial television set and a user control unit 23 which may be physically connected to the player unit 21 or a separate remote unit. The user operates the control unit to input commands to initiate the simple system functions of searching, frame by frame stepping, high speed scanning, still frame display, and standard pictorial display in standard, fast or slow motion. The user control unit 23 is hard-wired with the controls each dedicated and labeled for a single function. Certain functions may require a sequential operation of controls by the user to input a code designating the function and thus demanding from the user the steps of abstraction and mental translation.

In some instances, the control 23 may have a small memory capability, which allows key programming of sequences of still frame or motion, to be called up by hard-wired command. In some systems the remote controller can receive synchronizing or indexing data from the audio channel of the videodisc to effect that simple sequencing.

Still, the best user interaction with a system such as that of FIG. 1 is achieved through a human translation of messages on the TV display 22 such as "Press 1 to see the Cadillac, Press 2 for the Buick" and so forth. Simple branching can also be thus effected, but always with one crucial step added: the human translation of one value to another. This translation represents a two-step, indirect process of man-machine interface and is a barrier to "transparency". Also the system in FIG. 1 is limited to only the simplest sequencing and branching functions. The main advantage of this system is its low initial cost to the home user, and the low cost of its program materials, usually movies or concerts prerecorded on the videodisc.

Figure 2:
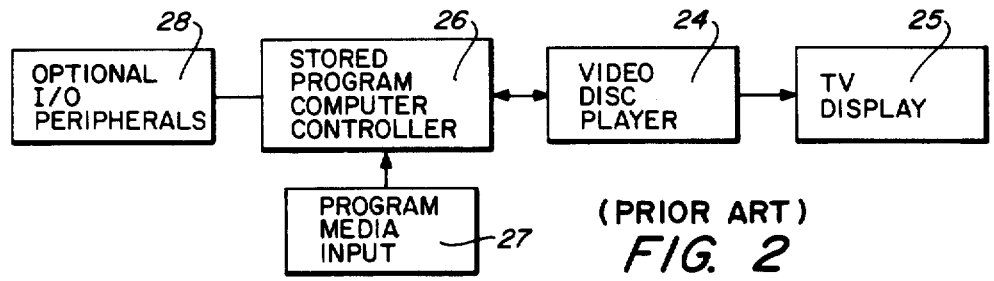
FIG. 2 is a block diagram illustrating a prior art user-programmable computer controlled automated system for instructional, entertainment, or reference use.

In FIG. 2 there is shown another system of the prior art having capability dramatically increased over that of the system of FIG. 1. Its cost is also dramatically increased.

The system of FIG. 2 also includes a videodisc player 24, a TV display 25 which also may be a standard commercial television set, a controller 26 in the form of a full capability stored program computer and a program media input 27. As indicated the system of FIG. 2 is equipped to handle a number of other I/O peripherals 28. With the full capability stored program computer 26 controlling the videodisc, rather than a simple hard-wired controller, logic decisions can be made based on user input, usually on a keyboard, but occasionally by a more direct peripheral I/O device 28 which increases the transparency of the software to the end user by allowing him direct input rather than translated input, as in FIG. 1.

The full operational program for a given function of the system is ordinarily input to the storage of the computer-controller 26 through the program media input unit 27 from a magnetic tape or other record media dedicated solely to programming data. The programming data is stored in the computer memory in order to enhance the randomness of its accessibility over its recorded form. Alternately the required random accessibility can be achieved through use of other types of program record media.

Because of the high cost of systems such as that of FIG. 2, they are not ordinarily considered for home or small institution purchase. Presently there are no computer/videodisc programs known to be commercially available.

Figure 3:
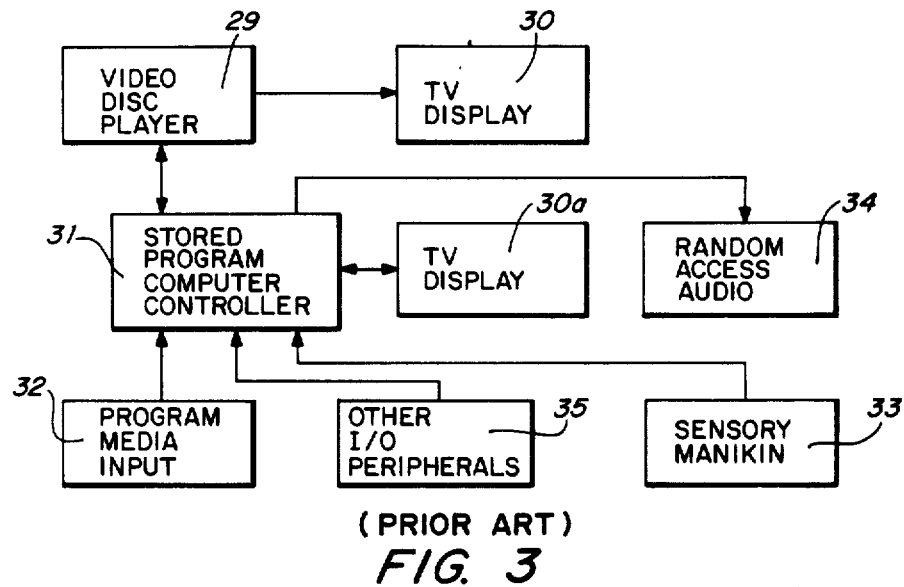
FIG. 3 is a block diagram of a highly automated instruction system of the prior art which uses floppy disc data input and numerous peripherals.

FIG. 3 shows a prior art system of highly complex configuration which is being considered for teaching cardiopulmonary resuscitation, a prime life saving skill which sustains life after cardiac arrest. The system of FIG. 3 comprises a videodisc player 29, a first TV display 30 receiving video from the player 29, a full capability stored program computer 31 including keyboard for program and data input, a program media diskette input 32, a second TV display 30a receiving computer generated graphics, a sensory manikin 33 providing both quantitative and qualitative input from the user, a random access audio unit 34 and additional optional I/O peripherals 35. The system of FIG. 3, which is more fully described in Videodisc News, Vol. 2, No. 2, February 1981, p. 2, concentrates on the high transparency needed when large numbers of lay users are to be trained in psychomotor skills. Techniques such as the random access audio 34 for continuing audible communication during still frame video display, the sensory manikin 33 to evaluate the student's physical performance and technique, and light pen input by the user to the second TV display 30a to eliminate the keyboard from the user interface add to the transparency of the system. Suffice it to say however, the high transparency achieved for mass instruction carried two heavy costs; first the initial system costs are far beyond the means of most home buyers and second highly skilled and costly maintenance is required because of the decreased reliability due to the numerous interactive parts.

It is to be noted that all of the prior art systems described use videodiscs on which are recorded only video and audio information together with sequencing or synchronizing data; any system control program data is derived from a different source.

Figure 4:
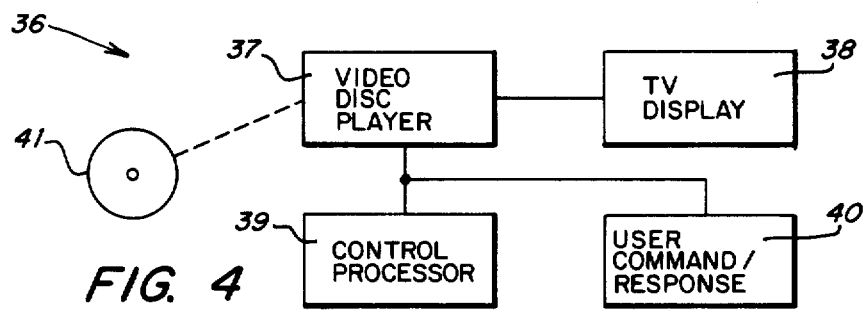
FIG. 4 is a block diagram illustrating the basic elements of a preferred embodiment of the system in the present invention.

The preferred embodiment of the system of the present invention designated generally as 36 is shown in the block diagram of FIG. 4. It comprises a videodisc player unit 37, a TV display unit 38, a central processor 39 and a user command/response unit 40, together with a prerecorded videodisc 41 suitable for playing on player 37.

The videodisc player unit 37 is of the standard commercially available optical laser type with self-contained mechanical and electrical operating elements. The Model LDP-1000 Optical Laser Videodisc player manufactured by Sony Corporation of Tokyo, Japan, has been found suitable for use as the videodisc player of the present invention. The TV display unit 38 may comprise any of the numerous commercially available standard television receivers for home or other user use. Thus the display unit 38 need not be a dedicated unit sold as a part of and useful only with full system of this invention but may be any television receiver acquired separately and already in use for entertainment purposes by the system owner. The use of the receiver in connection with the system of this invention will not in the least interfere with its continued use as a TV broadcast receiver for entertainment or other programming.

Command/response (C/R) unit 40 comprises a number of hardwired switch and analog control devices for manipulation by the user to input commands or response to the system. Some of the switch controls are dedicated and permanently labeled as to their function or input such as, the switch controls for "on", "off", "yes", and "no" and the "keyboard" switches for alpha-numeric inputs.

Figure 5:
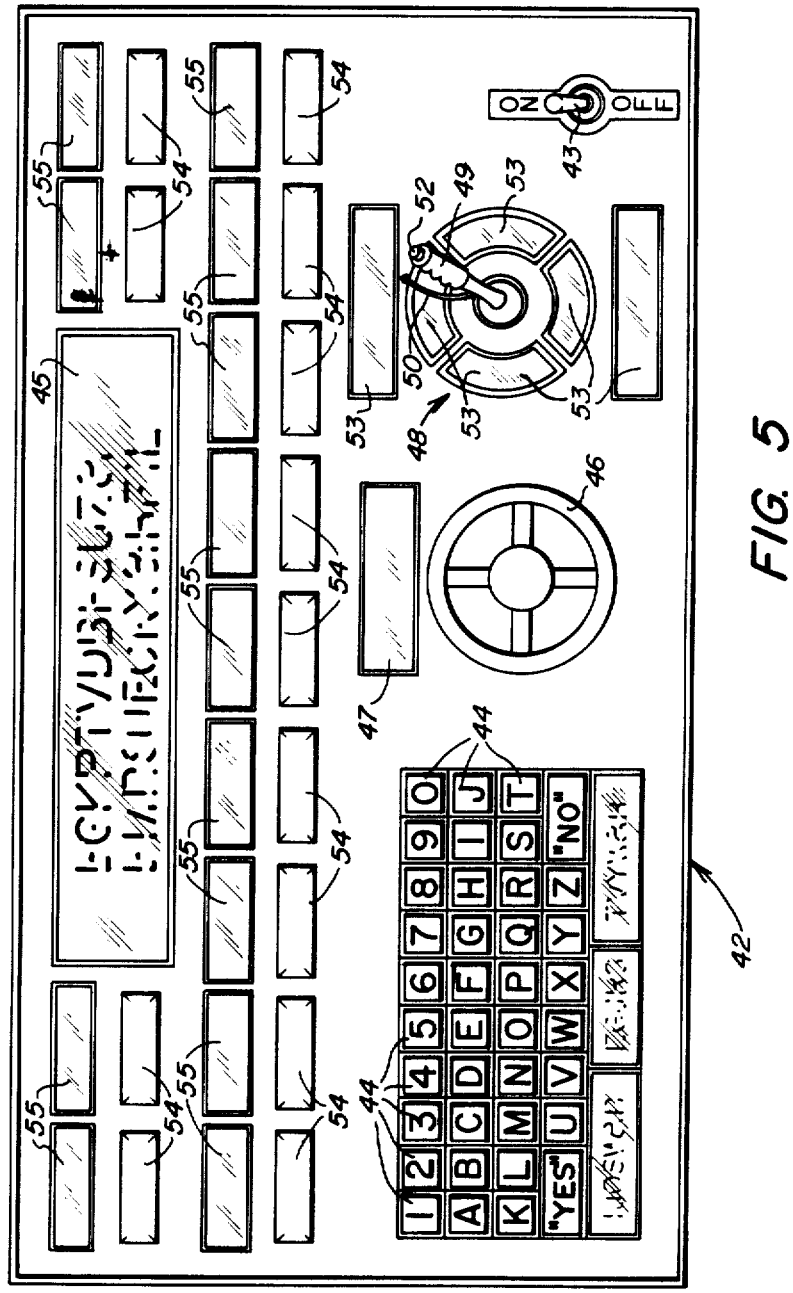
FIG. 5 illustrates a useful configuration of the control inputs on the front panel of a user command response unit for the system of the present invention.

Others of the controls have variable labeling which is controlled by and from program data prerecorded on the videodisc 41 along with pictorial, audio and other information and data carried on the disc. FIG. 5 illustrates a convenient front panel configuration for a user command/response unit 40. As shown in FIG. 5 the front panel designated generally as 42 may have permanently labeled switch controls such as, "on/off" switch 43, a set 44 of momentary contact switches with letter, numeral and "yes", "no" designations arranged more or less as a keyboard. Also contained on the front panel is a message display window 45 used to communicate written instructions, questions or information to the user. Message window 45 may take the form of a liquid crystal display or light emitting diode display or other controllable alpha-numeric display devices suitable for the purpose.

Additionally the panel 42 may provide a continuous 360° analog input through control wheel 46. The particular function or representation of control wheel 46 at any given time is displayed to the user in the variable label display 47 just above wheel 46. Display 47, like message window 45, may be an LCD, LED or other alpha-numeric display controllable by program instructions from the videodisc on player 37. Other variable or set displays or labels may be provided to assist the user in connection with analog control 46.

Also provided on panel 42 is a second analog input 48 which is operated/controlled by the user through a "joystick" mechanism 49 of the type well known in the art. There may be included an analog input 48, a proportional control 50 and a "fire" button 52. Associated with analog input 48 are one or more variable label displays 53. The labels 53 also may be LCD, LED, or other suitable electronically controllable alpha-numeric display devices. A plurality of additional digital or switch inputs 54, each with its own variable label 55 are provided on panel 42. Each of the variable labels 47, 53 and 55 is controlled by program inputs from the videodisc on player 37 to display for the user the current function represented by its associated input 46, 48 or 54 respectively. The uses and operation of the variable labels for the control inputs provided on panel 42 will be more fully explained subsequently. The switch devices provided on panel 42 need not be separate devices but may comprise unitary devices providing both functions. Devices of this type are well known.

Figure 6:
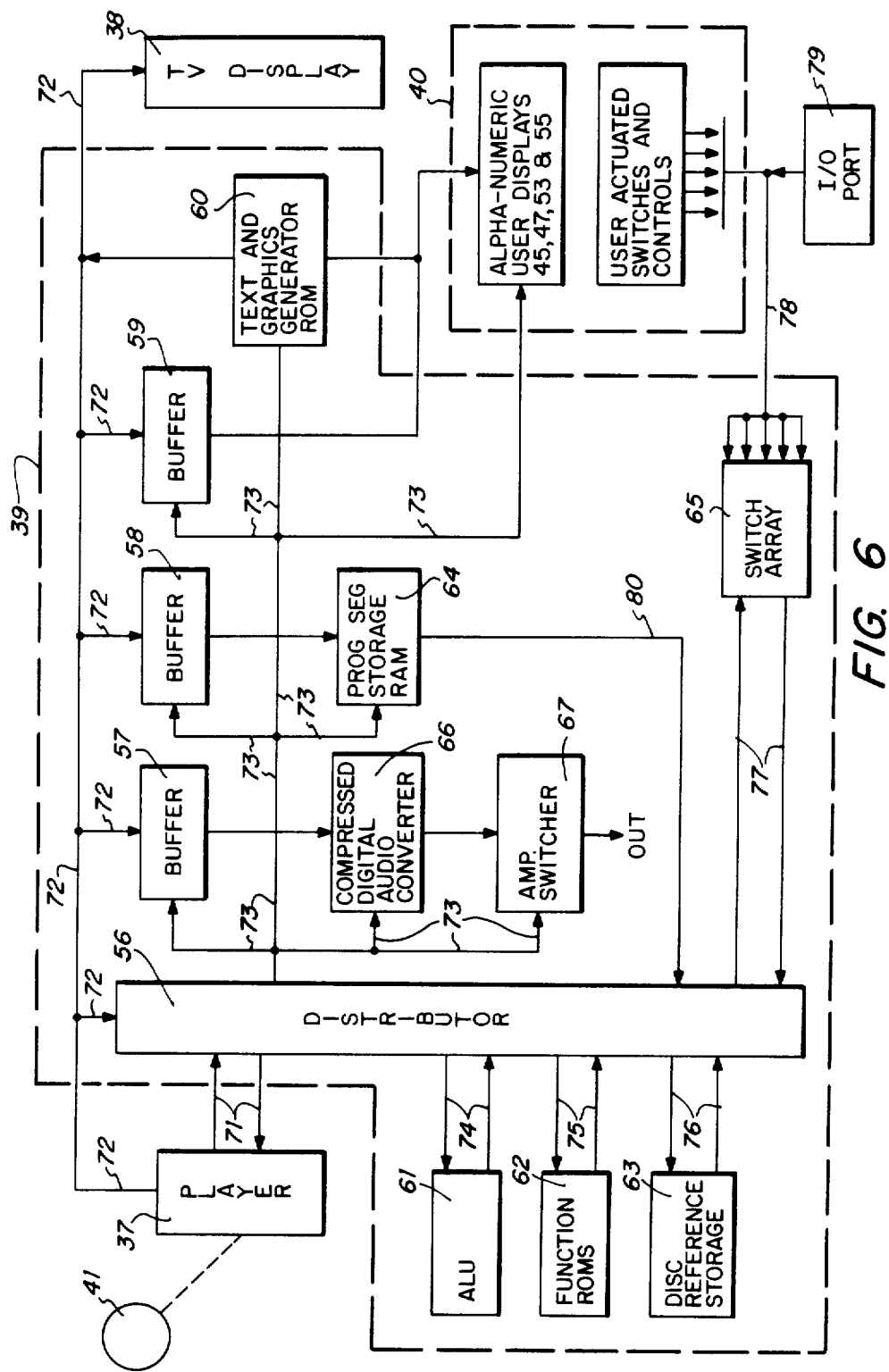
FIG. 6 is a diagramatic representation of the elements of the control processor of the present invention.

The control processor 39 of the system 36, as shown diagramatically in FIG. 6, comprises hard-wired electronic circuitry functions, and a minimal amount of buffer and program segment storage capability. Specifically control processor 39 includes the distributor 56, buffers 57, 58 and 59, a text and graphic generator ROM 60, a small arithmetic logic unit 61, function ROMS 62, disc reference storage unit 63, a program segment storage RAM 64, an electronic switch array 65 and, when needed, a compressed digital audio converter 66 and amplifier switcher 67. All of the elements of the control processor 39 may be circuits of standard types well known to those skilled in the art and, in accordance with current solid state technology, may all be incorporated into a simple integrated circuit chip including the interconnections between elements.

Distributor 56 is little more than an electronic switching network which, under direction of signals from the videodisc of player 37, directs the data and program information signals to and from the player 37 and the user command/response unit 40 and ultimately to the input of the TV display unit 38. In particular program and control signals flow between the distributor 56 and disc player 37 on lines 71. Information signals also are received by the control processor 39 from the player unit 37 on lines 72 and routed to distributor 56, the buffers 57, 58 and 59 and the input of TV display unit 38. Distributor 56 delivers program and/or information data signals on line 73 to buffer elements 57, 58 and 59, converter 66 and switcher 67, RAM 64, generator 60 and user displays 45 and 55 of unit 40. Signals also flow on lines 74, 75 and 76 respectively between distributor 56 and the ALU 61 for minor processing, the ROM 62 for call up of often used functions, and the reference storage unit 63 for subsequent use. Likewise signals flow on lines 77 between the distributor 56 and switch array 65 which in turn is receiving input signals on line 78 from the user activated switches of unit 40 and other optional I/O ports 79. Videodisc program signals are also received by the distributor over line 80 from the program segment storage of RAM 64. It will be recognized that the system is unique in that essentially all of the programming and control data for any application is contained in the vast reservoir of data resident in the videodisc. The specific applications of any program in the disc will include segments to direct the elements of process controller 39, the label configuration of user input displays 45, 47, 53 and 55 of the command/response unit 40 and the compressed digital audio signals for use with still frames.

The program data is so arranged on the videodisc that it is concomitant with the informational material it accompanies, in other words it is for the large part self-searching. Part of the usual deficiency of using digital program data from a video format has been low reliability, but in the present system so little data is needed in relation to the immense amount of storage available on the disc, that high redundancy can cover any possible bit errors of playout. Also it is to be remembered that a second form of data is generated by the videodisc player 37 independent of its data on the videodisc itself. This data will concern player indexing and synchronizing functions including exact frame locations. This player data moves directly back and forth between the player 37 and control processor 39 to give player information to and receive commands from the processor.

In a similar manner, hardwired information is available to the processor 39. The user input switches 44 and 54 and analog inputs 46 and 48 of C/R unit 40 are user activated, and the signals so generated are held momentarily in switching array 65, as are inputs from other I/O port inputs 79.

The elements of the control/processor 39 are relatively simple and of small capacity. This is possible because the structuring of the system puts by far the greater part of the programming and control functions in the data configuration on the videodisc 41 itself. Such structuring of the system allows the design goals of low cost, simplicity and reliability to be met. It will be obvious then that the processor 39 is no more than a multiplexing selector and distributor of information as opposed to a full capability stored program computer as that term is usually defined and understood.

In operation the processor may receive a short simple set of sequencing instructions buffered into the program segment storage RAM 64 from the videodisc 41 on player 37. The distributor 56, instructed by RAM 64 consults the disc reference memory 63, if necessary, draws upon the function ROM 62 for generic information and routes prompting instructions from videodisc 41 to display 45. After sampling the status signal from player 37 the distributor 56 may, if appropriate, apply signals from the videodisc 41 to activate the text and graphics generator ROM 60 to deliver graphic data to the input line 72 of TV display 38, receive a status indication from switch array 65, feed ALU 61 for any simple arithmetic required, operate converter 66 and switcher 67 when appropriate and then again sample RAM 64 to determine if any change has occurred.

Thus, it can be seen that by hard-wiring certain simpler functions in the processor 39 and recording programming process data as well as informational data on the videodisc 41 itself, the requirement for data and program management within the processor 39 is reduced far below that requiring a full capability stored program computer. Thus although the capability of the system 36 and its transparency are enhanced, the cost remains small.

Figure 7:
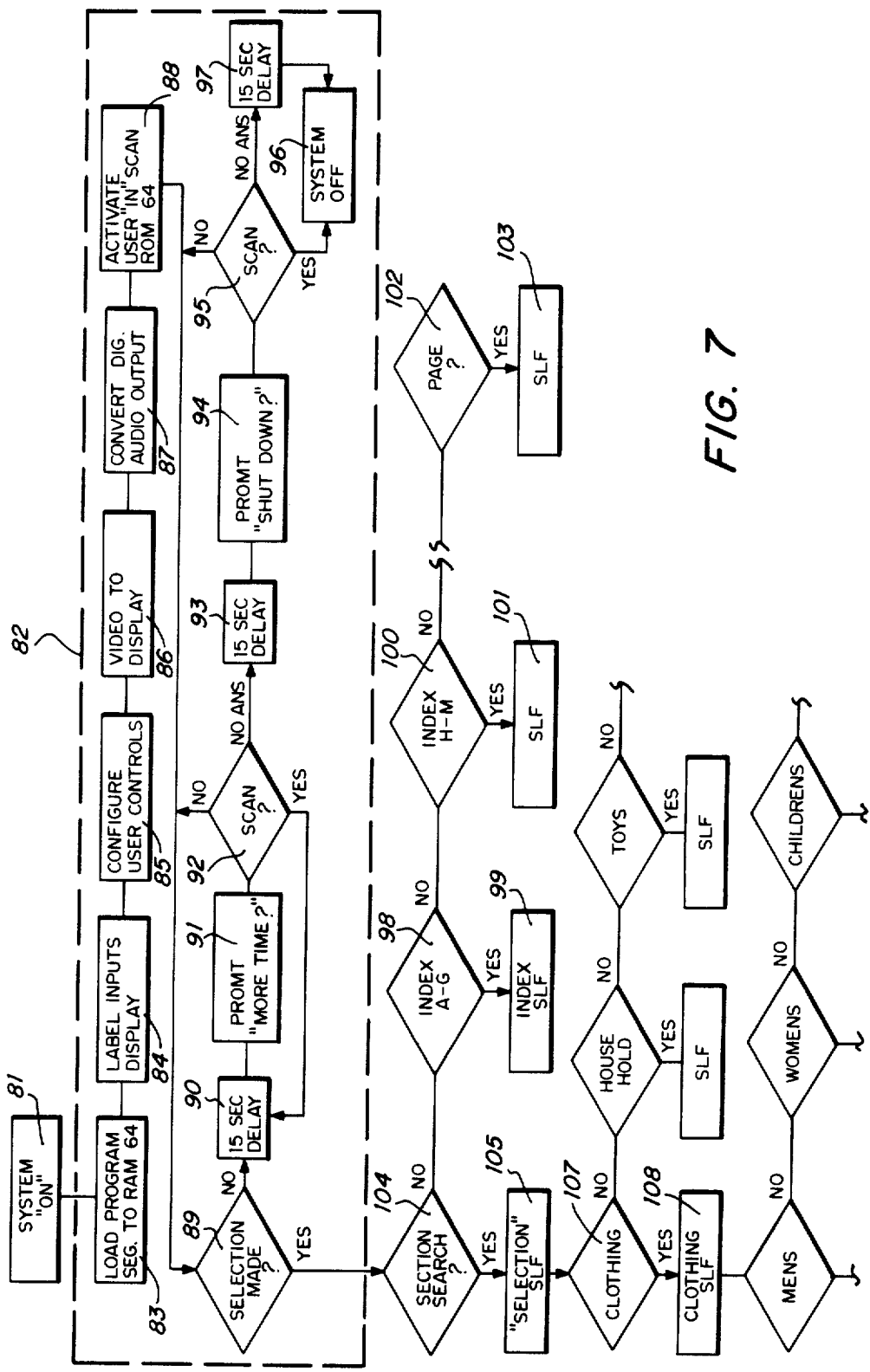
FIG. 7 is a diagram of program segments from the videodisc for the system operating in the "catalog" mode.

To illustrate a specific function of the system of the present invention and its "transparency" from the user's point of view, reference is now made to FIGS. 7, 8a, 8b, 9a and 9b. FIG. 7 is a diagrammatic representation of an illustrative portion of the disc-programmed operation of the system for the "catalog" function.

Referring now to FIGS. 6 and 7, when the system is turned "on" at 81 the initial segment load function (SLF) data is automatically selected from the videodisc record 41 and fed to the control processor 39. The initial SLF 82 loads a short program segment 83, which may be about eight thousand bytes or less, from the videodisc 41 through buffer 58 into RAM 64. Then under direction of this program segment the user displays 45, 47, 53 and 55 are appropriately labeled (84), the user controls 46, 48 and 54 are configured (85), video signals are applied to video unit 38 (86) and the digital audio if present on the videodisc is converted (87) and supplied to the audio output. Thereafter the "user input scan" of RAM 62 is activated (88).

The scan function 88 checks all of the user inputs to determine if the user has indicated a selection (89). If not, scanning continues for fifteen seconds (90) after which the prompter display window 45 and, if desired, the audio output are activated to ask the user if more time is needed (91). If a scan (92) indicates the user has pushed the "yes" control 44, the fifteen second delay 90 is repeated and the user again asks if more time is needed (91). If scan 92 indicates a "no" answer a check is made (89) to determine any selection. If no selection has been made the "no" is treated as "no answer" and the prompter window and audio, after a further fifteen second delay (93) ask "May I shut down?" (94). If scan 95 indicates a user "yes" input, the system shuts off (96). A "no" input recycles to determine if a selection has been made. If no selection is made within fifteen seconds, shut down is again requested at 94. If scan 95 indicates "no answer" in the fifteen second delay (97), the system is shut off (96).

When selection is made by the user a new segment load function (SLF) cycle is initiated dependent upon the user's selection. For example, if the user has indicated by his selection that he wishes to look at the A-G portion of the catalog index at 98, the videodisc is automatically searched to locate and load the corresponding program segment from the disc 41 to the RAM 64. Thereupon the full SLF for "Index A-G" 99 is put into operation. SLF 99 is of the same general form as the initial segment load function 82 but with different and appropriate control labels, control configurations video display information and audio outputs. Of course, each program segment and SLF may contain unique functions. A separate SLF may be, and ordinarily is, provided on the videodisc 41 for each user selection choice. Selection of "Index H-M" (100) places SLF 101 in operation; selection of a specific page number at 102 activates SLF 103 which may produce a pictorial video display, either still or moving, of the merchandise in actual use or being modeled and control labeling appropriate to determine the user's choice of color, model, etc., whether he desires to purchase and the type of purchase—"charge" or "cash".

Figure 9A:
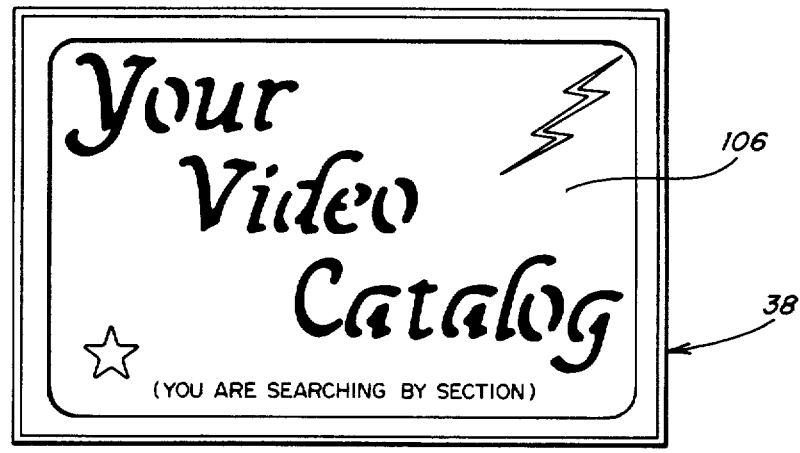
FIGS. 9a and 9b show the information displayed on the screen of the TV display unit concurrently with the labels on the panel displays of FIGS. 8a and 8b respectively.
Figure 8A:
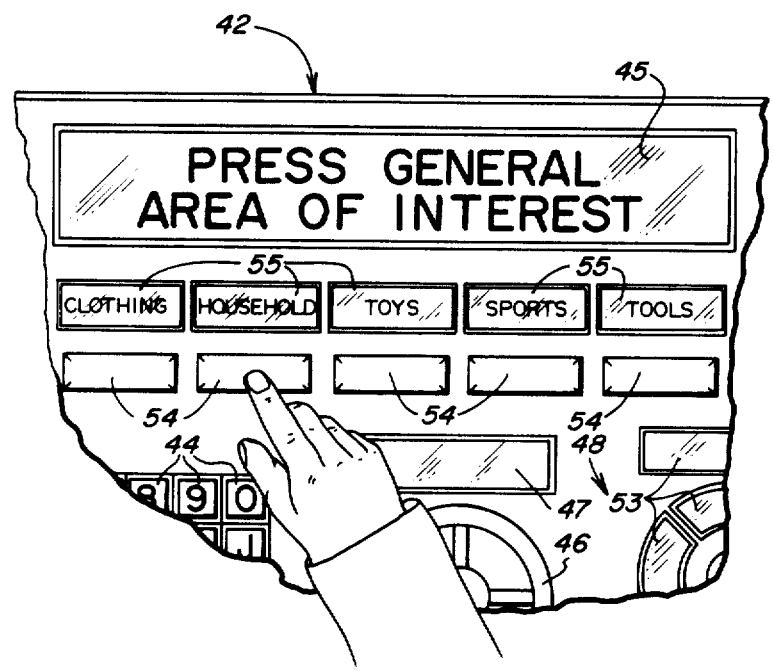
FIGS. 8a and 8b show portions of the panel of the Control/Response Unit as labeled at particular stages of the "catalog" program.

Assuming the user has selected "section search" 104 the "section" SLF 105 is searched from the videodisc record 41 and the user command/response unit 40 and video display unit 38 appropriately configured. By way of example FIG. 8a illustrates a portion of panel 42 on C/R unit 40 as configured by SLF 105. The variable label displays 55 provide direct literal indication of the specific choices offered the user by operation of the associated switches 54 such as "Clothing", "Household Goods", "Toys", "Automotive", etc. Choices of other modes of search such as "Index" or "New Section" are also offered. Prompter display window 45 has been activated to display an appropriate message or instruction. At the same time the screen 106 of video display unit 38 is activated to supply information to the user in graphic and pictorial form as illustrated in FIG. 9a.

Figure 9B:
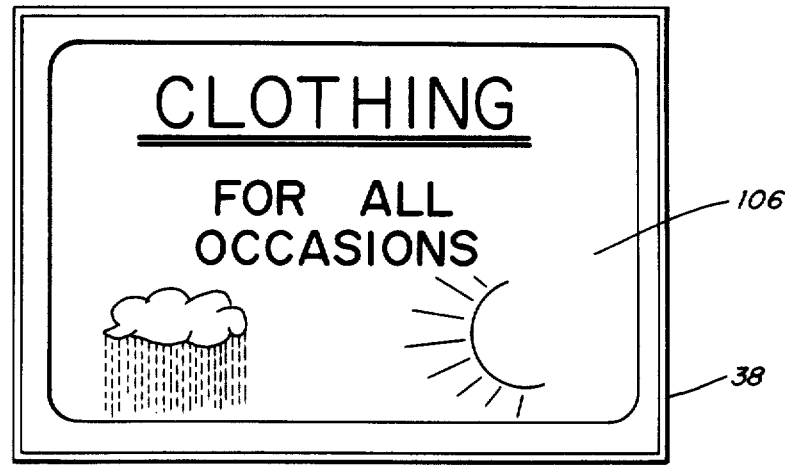
Figure 8B:
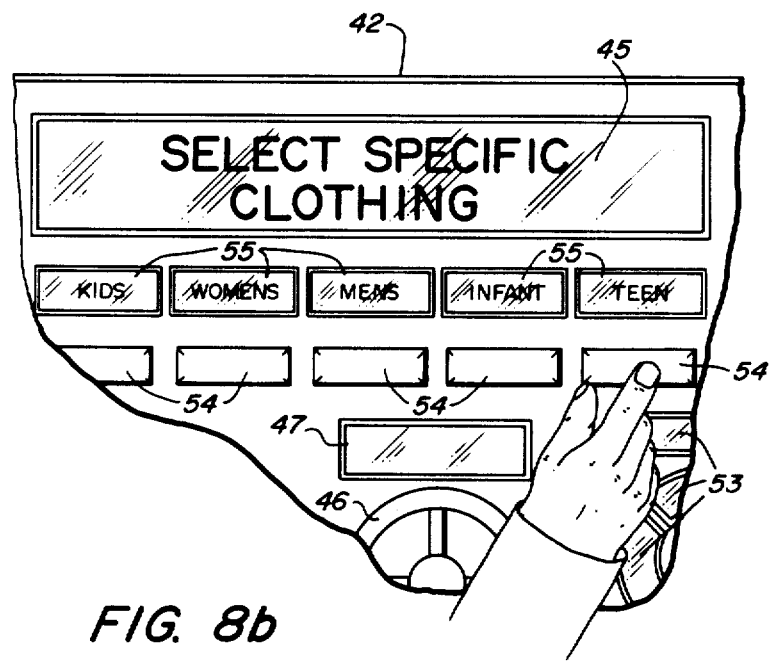

Returning to FIG. 7 the user's selection of "Clothing" 107 initiates the "Clothing" SLF 108. SLF 108 then provides the user with a new set of choices for selection of the types of clothing in which he is interested such as "Men's", "Women's", "Children's", etc. These new choices and new instructions are presented to the user by appropriate reconfiguration of the labels and displays of panels 42 as shown in FIG. 8b and by new visual presentations on screen 106 as shown in FIG. 9b.

The "transparency" of the system of the invention is now even more apparent. The user is not required to "push 1 for Clothing, 2 for Automobiles", etc., but instead makes his selection bearing the label "Clothing", "Automotive" or whatever else is available.

Shown in FIG. 10 is a diagram of a small portion of the program and system operation sequence with the system operating in the "Instruction" mode for a language lesson. The sequence of FIG. 10 begins after the user has turned the system "on". Through a series of selections similar to those outlined above in connection with FIG. 7, the user has chosen a language lesson in "Spanish II" to be carried out as a conversational dialog. These selections have moved the videodisc pickup to SLF 108. Segment load function 108 initiates a display of a segment of video information from the videodisc 41 on the screen 106 of display unit 38 and reconfiguration and labeling of the controls and displays of C/R unit 40.

For example, the information displayed may be "motion" video and audio segment 109 depicting on screen 106 as in FIG. 12, storeowner waiting on the user and asking an audible question in the language of study. Segment 109 ends in a "freeze frame" in which the storeowner awaits response from the user. The program segment 110 scans the user inputs which are now labeled as in FIG. 11. Prompter window 45 may also display instructions for how the user is to respond.

The user's response input selects the branch of the program to be continued. Any of the several appropriate and inappropriate responses offered the user when input by him will select a new segment of data from the videodisc. The new data segment selected will then show the storeowner to the screen 106 of TV display 38 taking a next logical action in response to the user input. For instance, if the user inputs an inappropriate response "dinero", the program branches at 111 to a new SLF 112. In the video and audio of the new segment 113 the storeowner may frown and say that he doesn't understand the user's answer and repeat the question to him. If the user inputs "dulces" the program branches at 114 to SLF 115. Program segment 116 video is then sent to display unit 38. The storeowner may respond with a smile and "Que clase?" Likewise a "nada" response by the user would branch the program at 117 to SLF 118 to produce video at 119 wherein the storeowner smiles and moves away to another customer. The language lesson would then continue through a dialogue between the storeowner and the user with the storeowner's actions and responses being called from the videodisc 41 depending on the branches of the program of FIG. 10 or of subsequent programs which are activated by the user's response inputs.

From the user's point of view, the system in this application operates very simply and directly. The screen 106 creates a learning context, and then the student is given the chance to interact, first seeing his choices in the label displays 55 and then pressing the switch key 54 associated with the display showing his choice. If he is not immediately sure of what he should do at this juncture, the prompter display 45 will keep him oriented. The prompter display 45 may also prompt or give instructions for using outside I/O ports 79 of FIG. 5. An example being a request to the user to speak his response into a voice input.

Figure 13:
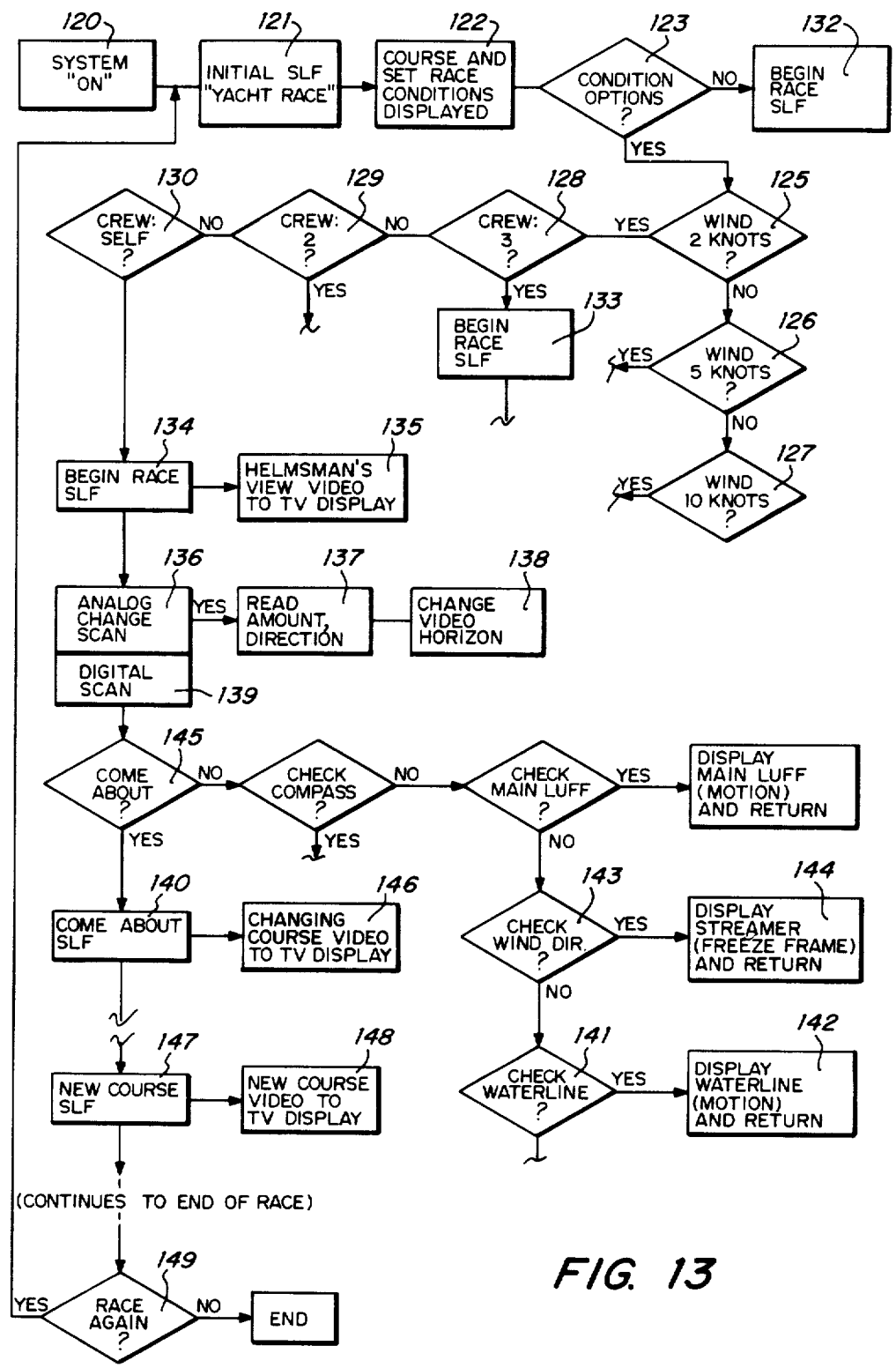
FIG. 13 is a diagram of program segments from the videodisc for the system operating in an entertainment or training mode.
Figure 15:
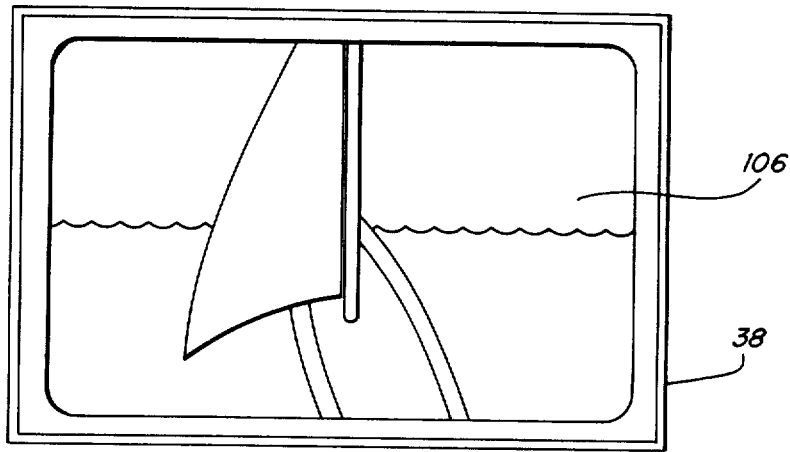
FIG. 15 shows the information displayed on the screen of the TV display unit concurrently with the panel display of FIG. 14.
Figure 14:
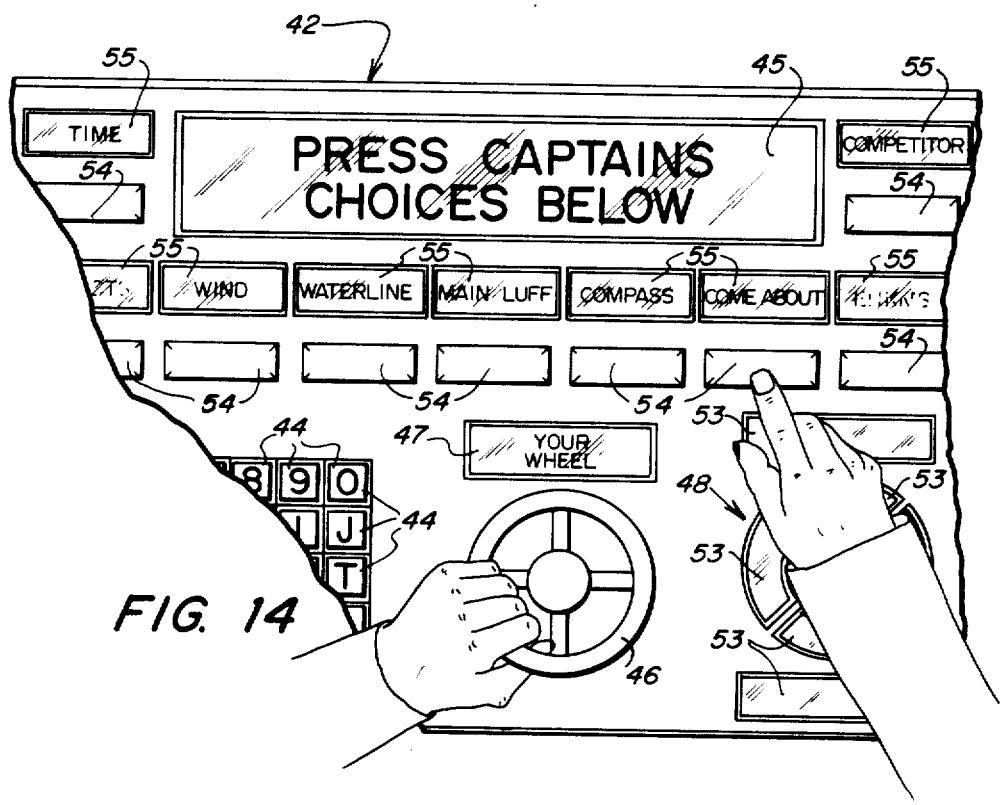
FIG. 14 shows a portion of the panel of the Control/Response Unit as configured at one point during operation of the entertainment mode.

FIGS. 13, 14 and 15 illustrate another example of the versatility and transparency of the present invention. In this example the system may be used solely for entertainment purposes or may be used for instructional or training purposes by providing "actual condition" simulation.

A portion of the program and sequence operation of the system for "yacht racing" is diagrammed in FIG. 13. The full side of the videodisc 41 may be devoted to such a function. Upon the user's initiating operation system "on" 120, the first segment load function 121 is automatically fed from the videodisc 41 into control processor 39. The TV display unit 38 displays the course over which the race is to be run and informs the user of the "set" race conditions and other race parameters as at 122. The user may be asked to provide some information input such as his sailing competency and experience or he may be allowed to select at 123 or initiate random selection by the system of other race conditions such as wind speed and direction, the race course to be run, the hazzards, the type of boat, and whether the race is to be run against time or in "head to head" competition.

After the user registers his choices of optional parameters and conditions for the race as at 124-130 of the program, a "begin race" SLF is selected from the videodisc 41. The particular "begin race" SLF selected is dependent upon the particular choices registered by the user; if the user registers no conditions option SLF 132 is initiated. A race in a two knot wind 125 with a three man crew will begin with SLF 133.

In the particular example of FIG. 13 SLF 134 begins the race since the user has chosen a two knot wind and a single man crew 130. By operation of SLF 134 the controls of the C/R unit 40 are labeled by data from the videodisc to present the boat's "cockpit" panel to the user. For example, as in FIG. 14, controls to carry out certain commands, such as "come about", are appropriately labeled as are other controls to call up displays on the screen 106 of TV display unit 38 of certain instruments such as the compass or anemometer or of the estimated chart position. The 360° analog input 46 is labeled by display 47 immediately above it as the boat "wheel" or tiller.

During the race the TV display 38 provides a helmsman's view of the "bow" scene from the boat as in FIG. 15 or, at the user's selection, of the port or starboard quarter or of beam sources or of others stored on the videodisc. The scenes and other indications change to simulate the action of the race according to user and programmed inputs and the race parameters. In this application the CP 39 operates in a multiplex mode between the control of, and feedback from, the videodisc player 37, the analog input 46 representing a sailboat's tiller, and checks off the user's requests and choices input to the controls during the race. The movement of the wheel 46 will cause the selection of sequences of videodisc frames which adjust the boat's keel on screen in relation to the horizon, and its azimuth to other objects. At any time, however, the "captain" may request checks or actions by using the labeled inputs 54 and may cause the control program to select from the videodisc a close-up video frame or select a sequence of motion frames which result from an action choise made by the user.

Returning to the diagram of FIG. 13, SLF 134 extracts from videodisc 41 motion video information which is sent to TV display 38 to provide the helmsman's view (135) on screen 106. Also there is begun a scan 136 to detect analog input changes ("wheel" changes). The amount and direction of change is detected (137) and appropriate video information is selected from the disc 41 to change the video horizon 138 (helmsman's view) according to the "wheel" change input.

Simultaneously digital scan (139) is conducted to detect "commands" from the "Captain" (user). A request by the "Captain" for "waterline check" (141) will produce motion video (142) of the boat waterline on the screen 106 for a short time and then a return to the helmsman's view. A request to check wind direction 143 will produce (144) a short period of display of the wind streamer. (This and some other displays may advantageously be produced by a "still frame" of video.)

A "come about" command 145 initiates a new SLF for "Come about" 140 which in turn produces at 146 presentation on screen 106 of video of the changing scenes as the boat changes. Setting of the new course initiates the appropriate "New course" SLF 147 and new video 148 of the new course. The operation of the system continues in a similar manner to the end of the race. The user then has his choice at 149 to "race again" or "end".

The system of the present invention is easily adaptable for multiple user applications. For example a multihead videodisc player at a single location (such as a central library or main catalog store) can provide simultaneous independent inputs to numerous widely scattered user stations (branch libraries or catalog order stations) through either direct wire or other types of signal coupling.

Figure 16:
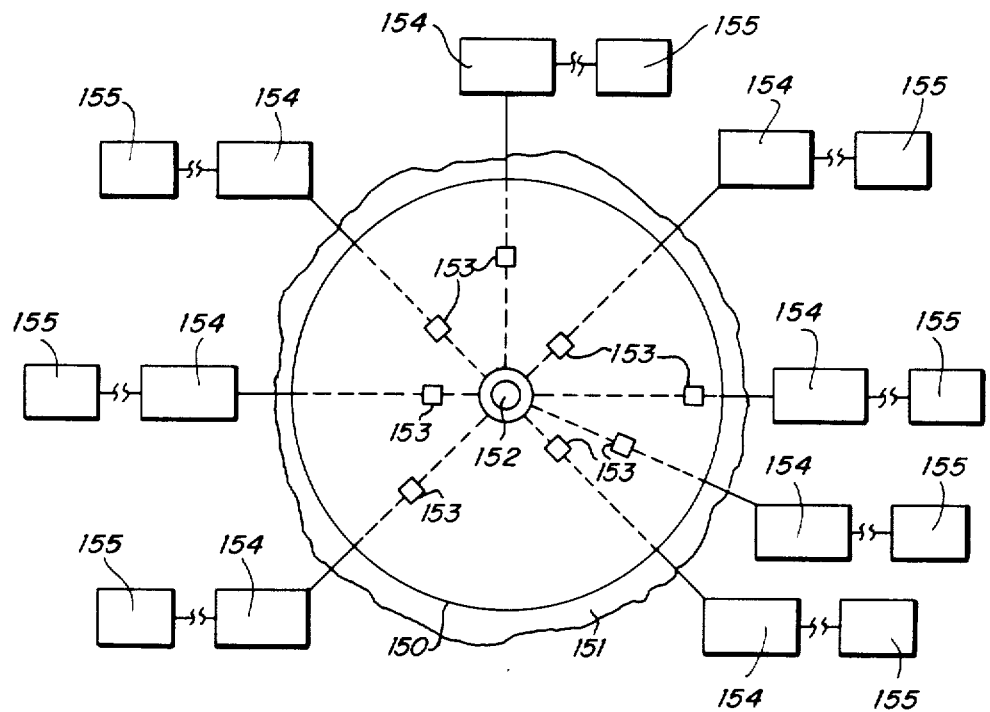
FIG. 16 illustrates schematically a multihead videodisc player unit.

FIG. 16 schematically illustrates such a multihead pickup arrangement for a player. The videodisc 150 is mounted on turntable 151 to rotate in normal fashion about the central axis 152. A plurality of pickup heads 153 are mounted along various radii at spaced intervals about the turntable 151. The intervals need not be equal. Each of the player heads has associated with it the same mechanical and electrical operating and control elements 154 as are found associated with the single pickup head of a standard videodisc player.

Because the data is recorded on the videodisc in multiple circular tracks rather than a single spiral track and because the head position and tracking is controlled by control elements 154 rather than by a groove or other physical part of the disc 150, the heads 153 may be operated entirely independently of each other. Thus each head independently serves and can be controlled by a different remote user station 155 comprising a CP unit, a TV display and C/R unit. Thus many students can obtain language lessons simultaneously from the same disc, no matter what the differences in their facility or progress rate are. Likewise numerous customers can be served from a single "catalog" disc simultaneously, no matter how diverse their shopping interests.

From the foregoing it can easily be seen that the system of the present invention is adaptable to other remote user systems such as any of the several types of two way communication cable TV systems now in operation.

Figure 17:
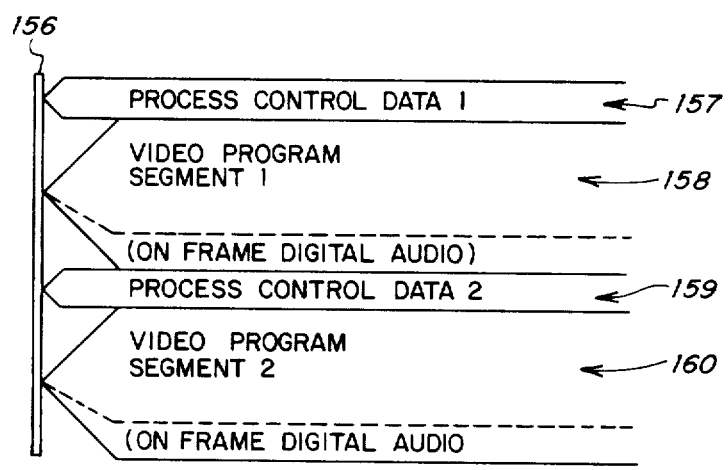
FIG. 17 shows diagramatically an arrangement of process control and video/audio information as recorded on the videodisc.

As stated previously, a feature of the present system is the inclusion in the material recorded on the videodisc of essentially all of the operational programming data as well as pictorial and indexing data and its placement in segments on the disc in reasonably close proximity to the informational and pictorial data segments with or for which it is to be used. Although many different arrangements of program, video and audio data are possible one arrangement found to be workable is that diagrammed in FIG. 17. In that Figure a segment of a videodisc record track is represented at 156. Recorded on the track is a first segment 157 of process control data which may include approximately eight thousand bytes or fewer of program data. On the next segment 158 is recorded a segment of video program or information. Segment 158 may contain approximately 420 frames of video information. Also included in this data segment of the record may be "on frame" digital compressed audio data related to the video data. Ideally the data of video segment 158 will have some relationship to the program data preceding segment 157 and the next succeeding segment of program data 159.

As shown, a further segment of video and audio data is recorded at 160. Alternating segments of control program and video pictorial data are recorded on the tracks of the disc. It has been found that the various segments of the same type of data need not be of the same length but may be of varied lengths as may be convenient.

Although many types of videodiscs and players which are commercially available are suitable for use in the system of the present invention, the player/disc combination providing random access frame search optical laser pickups are now the most desirable. However, capacity pickups both VHD and CED types for example, may in future be suitable. Further, although commercial home television receivers are suitable for use as the TV display unit 38, other types of monitors and displays are also suitable. When television receivers and certain other types of monitors are used for unit 38, the signal fed to the terminals will be a video (and audio) modulated radio frequency signal. Certain other types of displays require only the raw video and audio signals themselves.

Thus there has been disclosed an automated instruction, game and data retrieval system wherein the videodisc record carries not only the video/audio information but system control programming data as well. Because the major part of the system control comes from the disc itself, the control processor for the system is much less complex than the fully programmable computer controls of the prior art, and it has a significantly lower cost.

Having disclosed my invention, many changes and modifications still within the spirit and scope thereof will occur to those skilled in the art; therefore this invention is to be limited only as set forth in the following claims.

What I claim is:

1. An automated interactive game, instruction and reference system comprising: a videodisc player unit having at least one pickup head and mechanical and electrical control elements to position and actuate said pickup head in response to received control signals; a video display unit including a screen for the visual display of still and moving graphic and pictorial information supplied to said display unit is electrical signal form; a user command/response unit comprising a plurality of switch elements and analog control elements operable by a system user to produce selected manual input of user determined command and response signals, selected ones of said elements having associated therewith respective variable labelling means for conveying directly to the user the function represented by the associated element at that time; a videodisc record having recorded thereon a plurality of segmented groups of graphic and pictorial video information data and a plurality of segmented groups of system control and programming data; control processor unit comprising distributor means having signal controllable electronic switching and multiplexing elements and adapted to receive information, control and programming signals from said videodisc record and user input signals from said command/response unit and in response to certain of said received signals to direct others of said received signals to said videodisc player unit, said video display unit, said user command/response unit and internally within said control processor for the operation and control of each of said units and of said control processor unit; and interconnection means providing signal flow paths between said units and said various means.

2. The game, instruction and reference system defined in claim 1 wherein said videodisc player unit is of a type providing random access frame search.

3. The system defined in claim 2 wherein said videodisc player and said videodisc record are of the optical laser type.

4. The system defined in claim 2 wherein said videodisc player and said videodisc record are of the VHD capacitance pickup type.

5. The system defined in claim 2 wherein said videodisc player and said videodisc record are of the CED capacitance type.

6. The system defined in claim 2 wherein said video display unit is adapted to receive said graphic and pictorial information as a modulated radio frequency electrical signal.

7. The system defined in claim 6 wherein said video display unit is a commercial home television receiver.

8. The system defined in claim 2 wherein each said variable labelling means comprises electrical devices providing selectable visual display of alphanumeric symbol groups.

9. The system defined in claim 8 wherein each said variable labelling means comprises light emitting diode display devices.

10. The system defined in claim 8 wherein each said variable labelling means comprises liquid crystal display devices.

11. The system defined in any one of claims 1 thru 10 wherein said control processor unit further comprises random access memory means for storing short segments of programming data from said videodisc record.

12. The system as defined in any one of claims 1 thru 10 wherein said control processor unit further comprises read-only memory means for storing frequently used system functions.

13. The system defined in any one of claims 1 thru 10 wherein said control processor unit further comprises read-only memory means for text and graphic generation.

14. The system defined in any one of claims 1 thru 10 wherein said control processor unit further comprises compressed digital audio converter means.

15. The system defined in any one of claims 1 thru 10 wherein said control processor unit further comprises buffer means for short term storage of signals from said videodisc record.

16. An automated interactive game, instruction and reference system comprising: a videodisc player unit of the optical laser type having at least one pickup head and mechanical and electrical control elements to position and activate said pickup head in response to received control signals; a television receiver acting as a video display unit for the visual display of still and moving graphic and pictorial information supplied as electrical signals to the input terminals of said receiver; a user command/response unit comprising a plurality of switch elements operable by a system user to produce selected manual input of user determined command and response signals, selected ones of said elements having associated therewith respectively liquid crystal display labelling means for conveying directly to the user the function represented by the associated element at that time; a videodisc record recorded for optical laser pickup and having recorded thereon a plurality of segmented groups of system control and programming data and an interspersed plurality of segmented groups of graphic and pictorial information; control processor unit comprising distributor means of electrical signal controlled switching and multiplexing elements and adapted to receive information, control and programming signals from said videodisc record and user input signals from said command/response unit and in response to certain of said received signals to direct others of said received signals to said videodisc player unit said video display unit, said user command/response unit and internally within said control processor unit for the operation and control of each of said units and of said control processor unit, said control processor further comprising random access memory means for storing short segments of programming data from said videodisc record, a read only memory means for storing frequently used system functions, read only memory means for text and graphic generation, compressed digital audio converter means and buffer means for short-term storage of signals received from said videodisc record; and interconnection means providing signal flow paths between said units and said various means.

17. The system defined in claim 1 wherein said player unit has multiple pickup heads.

18. The system defined in claim 17 wherein each of said multiple pickup heads has associated individually therewith a user command/response unit, a control processor unit, a video display unit and interconnection means.

19. The system defined in claim 18 wherein said player unit is located remotely from the other units and means of said system.

20. An automated interactive game, instruction and reference system comprising: a video disc player unit of the optical laser type having provision for random access frame search and a pickup head and mechanical and electrical control elements to activate and position said pickup head in response to received control signals; a television receiver acting as a video display unit for the visual display of still and moving graphic and pictorial information received at the input terminals of said television receiver as modulated radio frequency electrical signals; a user command/reference unit comprising a plurality of switch elements and analog control elements manually operable by a system user to produce selected input of user-determined command and response signals, selected ones of said manually operable switch and control elements each having associated therewith a respective variable labeling means including liquid crystal devices providing selected visual display of alpha-numeric symbol groups for conveying directly to the user the function represented by the associated element at that time; a video disc record having recorded thereon for optical laser pickup a plurality of segmented groups of system control and programming data and an interspersed plurality of segmented groups of graphic and pictorial information; control processor unit comprising distributor means including electrical signal controlled switching and multiplexing elements adapted to receive information, control and programming signals from said video disc record and user input signals from said command/response unit and in response to certain of said received signals to direct others of said received signals to said video disc player unit, said video display unit, said user command/response unit and internally within said control processor unit for the operation and control of each of said units and of said control processor unit, said control processor unit further comprising random access memory means for storing short segments of programming data received from said video disc record, first read only memory means for storing frequently used system functions, second read only memory means for text and graphic generation, compressed digital audio converter means and buffer means for short term storage of signals received from said video disc record; and interconnection means providing signal flow paths between the various above recited elements of said system.

* * * * *

UNITED STATES PATENT AND TRADEMARK OFFICE
CERTIFICATE OF CORRECTION

PATENT NO. : 4,490,810

DATED : December 25, 1984

INVENTOR(S) : David C. Hon

It is certified that error appears in the above-identified patent and that said Letters Patent is hereby corrected as shown below:

Column 10, line 35, change "sources" to -- scenes --

Column 12, line 48, change "is" to -- in --

Column 14, line 6, change "of" to -- including -- line 16, after "processor" insert -- unit --

Signed and Sealed this

Twenty-first Day of May 1985

[SEAL]

Attest:

DONALD J. QUIGG

Attesting Officer    Acting Commissioner of Patents and Trademarks